:::
United States Patent Office 3,056,765
Patented Oct. 2, 1962

3,056,765
SULFONATION OF ALKENYLAROMATIC
RESINS WITH SULFURIC ACID
Edwin R. Cowherd, William C. Bauman, and Ralph M.
Wiley, Midland, Mich., assignors to The Dow Chemical
Company, Midland, Mich., a corporation of Delaware
No Drawing. Filed Sept. 2, 1958, Ser. No. 758,581
6 Claims. (Cl. 260—79.3)

This invention relates to the sulfonation of benzene-soluble alkenylaromatic resins by reaction with sulfuric acid to obtain resin sulfonic acids, and it particularly pertains to an improvement in such sulfonation process wherein the resin in finely divided solid form is mixed with sulfuric acid and partially sulfonated, the resulting mixture is dispersed into and suspended in a liquid chlorinated aliphatic hydrocarbon, and the sulfonation reaction is completed in such suspension.

The starting resins with which this invention is concerned are benzene-soluble alkenylaromatic resins, by which term is meant solid addition polymers having recurring structural units at least 50 percent by weight of which correspond to at least one of the alkenylaromatic compounds having the general formula:

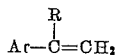

wherein the symbol Ar represents a monovalent aromatic radical having its valence bond on a carbon atom of a sulfonatable aromatic nucleus, the symbol R represents hydrogen or a methyl radical, and the other symbols have their usual meanings. Examples of such alkenylaromatic resins which can be sulfonated in accordance with the present invention are the solid homopolymers of styrene, α-methylstyrene, ar-methylstyrenes (ar-vinyltoluenes), ar-dimethylstyrenes, α,ar-dimethylstyrenes (ar-isopropenyltoluenes), ar-ethylstyrenes, vinylnaphthalenes, and ar-chlorostyrenes; copolymers of two or more of such alkenylaromatic compounds, e.g. copolymers of styrene and ar-vinyltoluene and of styrene and α-methylstyrene; and copolymers of one or more of such alkenylaromatic compounds and minor proportions, i.e. less than 50 percent by weight of the polymer, of other vinylidene compounds such as olefinic hydrocarbons, e.g. isobutylene and 1,3-butadiene, ethylenically unsaturated esters, e.g. from one to twelve carbon atom alkyl esters of acrylic or methacrylic acid, and acrylonitrile.

Polystyrene and other alkenylaromatic resins have heretofore been sulfonated by reaction thereof with sulfonation agents such as sulfuric acid, oleum, chlorosulfonic acid, sulfur trioxide, and complexes of sulfur trioxide with ethers and ketones.

While polystyrene and other alkenylaromatic resins have been sulfonated by reaction thereof with sulfuric acid to obtain incompletely sulfonated products and water-insoluble sulfonated products, the sulfonation of suc alkenylaromatic resins with sulfuric acid to obtain water-swellable and water-soluble resin sulfonates has not been altogether satisfactory. Particular difficulty has been encountered in that the reaction mixture of an alkenylaromatic resin, per se or in solution in a liquid chlorinated hydrocarbon medium, and sulfuric acid rapidly converts to a gummy gelled mass which is difficult to stir or to transfer through pumps and pipelines. These opearting difficulties are particularly grave when the operations are carried out on a large, e.g. commerical, scale.

It is among the objects of this invention to provide improvement in the sulfonation of benzene-soluble alkenylaromatic resins of the kind described supra by reaction thereof with sulfuric acid to obtain water-swellable and water-soluble resin sulfonic acids. A more particular object is to provide improvement in the operating procedure for preparing a reaction mixture and carrying out a reaction of sulfuric acid and an alkenylaromatic resin. Another object is to provide means for obtaining the resin sulfonate product in the form of discrete solidified beads suspended as a slurry in a liquid chlorinated aliphatic hydrocarbon medium. Other objects and advantages of the invention will become apparent in the following description.

The objects of this invention have been attained in an improved process, fully set forth hereinafter, wherein the starting benzene-soluble solid alkenylaromatic resin in finely divided form is dispersed into sulfuric acid and partially sulfonated, but not to an extent causing appreciable solubility in the sulfuric acid, the resulting mixture of the sulfuric acid and partially sulfonated resin is dispersed as a discontinuous phase into a liquid chlorinated aliphatic hydrocarbon as a continuous phase, and the sulfonation reaction is continued and completed while the sulfuric acid-resin-sulfonate phase is so suspended.

The sulfuric acid for use in this process is preferably ordinary commercial-grade sulfuric acid, although any sulfuric acid can be used which has from 90 to 100 percent strength, i.e., from 90 to 100 percent by weight calculated as $H_2SO_4$.

Examples of liquid chlorinated aliphatic hydrocarbons suitable for use in this process are methylene chloride, chloroform, carbon tetrachloride, ethylene dichloride, 1,1-dichloroethane, methylchloroform, trichloroethylene, perchloroethylene, 1,1,1,2-tetrachloroethane, 1,1,2,2-tetrachloroethane, and mixtures of liquid chlorinated aliphatic hydrocarbons.

The alkenylaromatic resins that have been described hereinbefore are suitable for use in this process. The starting resins are used in finely divided form, preferably particles having diameters in the order of 20 microns and smaller. Particularly suitable are the finely divided solid polymers made by polymerizing the corresponding monomers in aqueous emulsion and recovering the resulting colloidal polymer without massive coagulation, e.g. by spray drying. The starting solid polymers may also be put into finely divided form by grinding or other methods already known per se.

In carrying out the present method, the finely divided solid starting polymer (either not containing any liquid or perhaps being only swollen with a liquid swelling agent) is mixed with and dispersed into the sulfuric acid, usually in amounts corresponding to from 1 to 10 mole-weights of sulfuric acid per mole-weight of the alkenylaromatic compound in the polymer to be sulfonated. The resulting mixture is maintained at reaction temperatures between 0° C. and 200° C., preferably between 0° C. and 100° C. and with stirring, to obtain appreciable sulfonation of at least the surface of the starting resin particles. Such sulfonation reaction is continued until at least the surface of the starting resin particles is sulfonated to an appreciable extent (sufficient to make the resulting partially sulfonated resin particles no longer soluble in liquid chlorinated aliphatic hydrocarbons) but not to such an extent that the sulfonated resin is appreciably soluble in the sulfuric acid. As the sulfonation of the resin particles in the sulfuric acid proceeds, a condition is reached wherein the particles begin to swell and become slightly sticky to one another, and the sulfuric acid-resin mixture begins to thicken, i.e. the viscosity of the reaction mixture increases. It is at, or just prior to, this stage that the reaction mixture is advantageously carried to the next step in the present process. If the sulfonation of the resin particles in the sulfuric acid were allowed to continue without further modification, the resin sulfonic acid would dissolve in the sulfuric acid, the viscosity of the reaction mixture would increase, and an intractable gel or taffy-like mass would result.

In accordance with the present invention, the reaction mixture of sulfuric acid and partially sulfonated resin particles, while still fluid, is mixed with and dispersed as droplets or globules of a discontinuous phase into a liquid chlorinated aliphatic hydrocarbon as a continuous phase and suspending medium.

The dispersion can be obtained by conventional mechanical means, such as by means of stirring or by means of squirting the sulfuric acid-resin mixture through orifices into a body of the liquid chlorinated aliphatic hydrocarbon medium.

Preferably, but not necessarily, the liquid chlorinated aliphatic hydrocarbon also contains an emulsifying agent for the sulfuric acid-resin mixture, such agent suitably being a hydrophobic colloidally dispersed water-in-oil type emulsifier-stabilizer.

Colloidal particle water-in-oil emulsifier-stabilizers are already known per se, and are characterized by a balance of hydrophile-hydrophobe properties such that the equilibrium position of the emulsifier-stabilizers in an oil-water system is on the external, or convex surface of the water-droplets suspended in the oil phase.

In the present instance, and for the present purposes, the discontinuous phase consists of droplets containing sulfuric acid and the continuous phase is the chlorinated aliphatic hydrocarbon. Accordingly, the stabilizer particles are ones whose equilibrium position in such system is on the external, or convex, surface of the sulfuric acid-containing droplets suspended in the chlorinated aliphatic hydrocarbon phase. Obviously, the suitable stabilizers are ones whose function as stabilizer is not adversely affected by reaction with the constitutents of the mixture to be stabilized.

The suitability of colloidal particle water-in-oil emulsifier-stabilizers for use in the present process can readily be ascertained by carrying out a simple test as follows:

Into a closeable container such as a glass vial whose inner surface has preferably been rendered hydrophobic and is not wettable with concentrated sulfuric acid place concentrated sulfuric acid and an at least equal volume of a liquid chlorinated aliphatic hydrocarbon such as perchloroethylene containing a small amount, e.g. from 0.01 to 0.5 percent by weight, of the water-in-oil emulsifier-stabilizer to be tested, leaving ample free space in the container to permit vigorous shaking of the liquid contents. Close the container, and shake vigorously to emulsify the concentrated sulfuric acid into the chlorinated aliphatic hydrocarbon, preferably shaking vigorously for a few seconds, letting stand for a brief interval such as 0.5–1 minute, and repeating such cycle a number of times, e.g. five times. Thereafter, allow the mixture to stand quietly for a time such as five minutes and observe the extent to which the sulfuric acid phase has remained emulsified or has coalesced into a continuous layer. Stabilizers which hold more than 50 percent of the acid in emulsion are here regarded as satisfactory, from 90 to 100 percent being good. Agents which do not hold at least 50 percent of the acid in emulsion are not satisfactory for the present purposes, although in some instances satisfactory results can be obtained by using somewhat larger proportions of such agents. Agents which are required in amounts appreciably greater than about 3 percent by weight of the sulfuric acid phase are generally not economically satisfactory for the present purposes.

Suitable colloidal particle emulsifier-stabilizers for the present purposes are represented by a wide variety of materials, including organic and inorganic materials. In some instances, the required hydrophile-hydrophobe balance is inherent in the material, and in others the balance is attained by treatments which render normally hydrophilic particles more hydrophobic or normally hydrophobic particles more hydrophilic.

One preferred kind of colloidal particle stablizer for the purposes of this invention comprises finely divided particles of inorganic hydroxy-oxides wherein a portion of the particle surfaces is chemically bonded to hydrocarbon radical-substituted silicon groups such as hydrocarbon-silyl, hydrocarbon-silylene, or hydrocarbon-silylidyne groups.

These kinds of solid particle emulsifier-stabilizers are usually prepared from normally hydrophilic inorganic hydroxy-oxides such as those of aluminum, titanium, iron and silicon, and diatomaceous earth and clays, by incompletely reacting the surface thereof with a hydrocarbon radical-substituted silicon reactant capable of yielding a hydrocarbon-silyl, hydrocarbon-silylene, or a hydrocarbon-silylidyne group, such as hydrocarbon-halosilane, a hydrocarbon-silanol, a hydrocarbon-silazane, a hydrocarbon-aroxysilane, a hydrocarbon-alkoxysilane, or a hydrocarbon-acyloxysilane. The hydrocarbon radicals in these compounds include long and short chain saturated and unsaturated aliphatic hydrocarbon radicals, e.g. alkyl and alkenyl radicals having from one to twenty carbon atoms, aralkyl radicals, alkaryl radicals, and aryl radicals. The preferred organo-silicon reactants are the hydrocarbon-halosilanes including the mono-, di-, and tri-chloro-, bromo-, and iodo-silanes.

For the purposes of functioning as emulsifier-stabilizers, the finely-divided inorganic hydroxy-oxides are reacted with the aforementioned hydrocarbon radical-substituted silicon compounds only to an extent such that an appreciable portion, but not all, of the resulting particle surface is still occupied by the original hydrophilic hydroxy-oxide groups. Stated more specifically, and in terms conventional in the art, the surfaces of the treated solid emulsifier-stabilizer particles for use in this invention are from approximately 25 to approximately 85 percent hydroxylated, the balance of the particle surface being chemically bonded to hydrocarbon-substituted silicon groups as described above. When the surfaces are hydroxylated appreciably outside of this range, the resulting particles are either too hydrophobic or too hydrophilic to act as emulsifier-stabilizers in water-in-oil emulsion systems and are not suitable for the present purposes.

Since these solid particle emulsifier-stabilizers are usually prepared by reacting the inorganic hydroxy-oxides and the organo-silicon compounds in an inert organic liquid medium that can be a liquid chlorinated aliphatic hydrocarbon, it is convenient to prepare and to use the solid particle emulsifier-stabilizers in the form of colloidal suspensions thereof in liquid chlorinated aliphatic hydrocarbons.

Another preferred kind of colloidal particle stabilizer comprises finely divided solid particles of an aminated hydrous aluminum silicate, preferably an aminated montmorillonite such as an aminated bentonite. These emulsifier-stabilizers are hydrous aluminum silicates, usually of the exfoliating montmorillonite type such as bentonite clay, whose base-exchange properties have been modified by amination with organic amines, particularly amines having at least one long hydrocarbon group, e.g. a saturated or unsaturated aliphatic hydrocarbon radical having a chain of from eight to twenty carbon atoms. The amine can be primary, secondary, tertiary or quaternary ammonium compound, and the other substituent groups can be long or short chain hydrocarbon radicals including one to twenty carbon atom saturated and unsaturated aliphatic hydrocarbon radicals, araliphatic radicals, alkaryl radicals, and aryl radicals. By way of specific illustration and not as restrictive, it may be mentioned that a commercially available colloidal particle emulsifier-stabilizer suitable for the purposes of this invention is a dimethyl dioctadecyl ammonium bentonite whose particles are platelets having average diameters of from 0.05 to 1 micron and thickness of from 0.002 to 0.004 micron.

Other examples of suitable emulsifier-stabilizers, for purpose of illustration and not of restriction, include linear, high molecular weight polyethylene; a graft polymer containing 10 percent by weight of acrylic acid grafted on a linear polyethylene; a product obtained from a copolymer of styrene and 5.2 percent by weight of ar-chloromethylstyrene by reacting approximately 50 percent of the chloromethyl group with trimethylamine; a copolymer of vinylidene chloride and 7.5 percent by weight of acrylonitrile; a copolymer of dichlorostyrene and 5 percent by weight of 1-ethynylcyclohexanol; a ternary copolymer of dichlorostyrene, 5 percent by weight of 1-ethynylcyclohexanol and 2 percent by weight of styrene; and a graft copolymer containing 9 percent by weight of vinylpyrrolidone grafted on a linear polyethylene. It may be noted that some of the aforementioned organic polymer materials "dissolve" in the chlorinated aliphatic hydrocarbon suspending medium to form a colloidal solution, the effective colloidal particle of the stabilizer in such instances probably being a macromolecule or aggregate of macromolecules of the polymer.

In carrying out the present method, the sulfuric acid-partially sulfonated resin mixture and the liquid chlorinated aliphatic hydrocarbon suspending medium are mixed together in convenient proportions to make a fluid dispersion, usually in amounts such that the sulfuric acid-resin phase corresponds to from 1 to 50, preferably from 10 to 25, percent by weight of the whole mixture. The amount of the colloidal particle emulsifier-stabilizer when employed in the liquid chlorinated aliphatic hydrocarbon suspending medium usually corresponds to from 0.1 to 2.5 percent by weight of the sulfuric acid-resin phase in the mixture.

It might be mentioned that it is sometimes advantageous to render the surfaces of the reactor vessel, agitator, and other parts hydrophobic, e.g. by contacting the same with a hydrocarbon radical-substituted silicon compound such as a hydrocarbon-halosilane or solution thereof in a hydrocarbon or chlorinated hydrocarbon solvent, before contacting such surfaces with the sulfuric acid-polymer sulfonate composition in order to prevent the sulfuric acid-polymer sulfonate composition from sticking to the surfaces of the apparatus.

The suspension of the droplets or globules of the sulfuric acid-partially sulfonated resin particles mixture in the hydrophobic liquid chlorinated aliphatic hydrocarbon suspending medium is effected by mechanical means as hereinbefore described, e.g. by subjecting the mixture to moderate agitation, preferably by conventional stirring. The resulting suspension is mainttained at sulfonation reaction temperatures between 0° C. and 200° C., preferably between 0° C. and 100° C., at any convenient pressure. The sulfonation reaction between the sulfuric acid and the resin in the suspended droplets or globules is allowed to proceed until the desired degree of sulfonation is attained, e.g. until the resin sulfonic acid is soluble in water.

When the process is carried out in accordance with this method, the whole reaction mixture is, throughout the course of the reaction, fluid and easily stirred, pumped, transferred through valves and pipelines, and subjected to heat exchange, even though the sulfuric acid-resin sulfonic acid phase per se undergoes considerable viscosity change and becomes semi-solid or even solid. In accordance with this method, when the sulfonation reaction is completed or is terminated, the resulting reaction mixture is a free-flowing slurry of semi-solid or solid beads of resin sulfonate suspended in the liquid chlorinated aliphatic hydrocarbon medium. It will be understood that the colloidal particle emulsifier-stabilizer, or further portions thereof, can be added to the reaction mixture after the formation of beads to provide further stabilization thereof. Because of the stability of the resin sulfonate beads, the slurry can conveniently be handled in commercial operations. For example, the slurry can be filtered, decanted, or centrifuged to obtain a bead portion and a liquid chlorinated aliphatic hydrocarbon portion which can be recovered for reuse or use in other ways. The bead portion can be extracted to remove the unreacted sulfuric acid therefrom and to obtain the alkenylaromatic resin sulfonate in convenient solid bead form.

Instead of recovering the resin sulfonic acid per se from the bead-containing reaction mixture, the acids can be converted to salts by addition to the reaction mixture of base-acting materials such as alkali metal hydroxides, ammonia, and amines, and the resulting resin sulfonate salts can then be recovered in bead form from the reaction mixture.

The following example illustrates the invention but is not to be construed as limiting its scope.

*Example*

The starting alkenylaromatic resin employed in this example was a polymer prepared by emulsion polymerization of an ar-vinyltoluene containing approximately 60 percent by weight of m-vinyltoluene and approximately 40 percent by weight of p-vinyltoluene. The resulting aqueous colloidal polymer dispersion was spray dried to obtain the polymer as a dry, finely divided powder. The polymer was soluble in benzene, and a solution of the polymer in nine times its weight of toluene had a viscosity at 25° C. of 1180 centipoises.

The sulfuric acid employed in this example was a commercial-grade 99 percent sulfuric acid.

The liquid chlorinated aliphatic hydrocarbon employed in this example was perchloroethylene.

A colloidal particle emulsifier-stabilizer was employed in this example, the same being prepared by mixing 250 ml. of perchloroethylene, 0.375 ml. of octadecyltrichlorosilane, and 5 grams of colloidal silica in a high speed rotating blade homogenizer (Waring Blendor) for five minutes. The colloidal silica used in this preparation was a fumed silica whose particles had average diameters in the order of 15–20 millimicrons and surface area in the order of from 175 to 200 square meters per gram. Ten mililiters of the resulting dispersion contained approximately 0.196 gram of the silane-treated silica.

Ten grams of the finely divided ar-vinyltoluene polymer powder and 41 grams of the commercial grade 99 percent sulfuric acid were mixed together at room temperature. After five minutes, the sulfuric acid-resin sulfonate mixture was stirred into a mixture of 60 ml. of perchloroethylene and 10 ml. of the silane-treated silica dispersion in perchloroethylene described above, the resulting mixture being stirred to disperse the sulfuric acid-resin sulfonate phase as droplets approximately one millimeter in diameter in the perchloroethylene suspending medium.

The resulting suspension was heated at 95° C. for one hour with continued moderate stirring to keep the sulfuric acid-resin sulfonate phase dispersed in the suspension. The resulting reaction mixture was a free-flowing slurry of discrete solid beads suspended in the perchloroethylene liquid medium. The beads were allowed to settle, and the perchloroethylene was decanted from the settled beads. The beads were extracted with concentrated hydrochloric acid to remove unreacted sulfuric acid and dried under vacuum. There were thereby obtained free-flowing solid beads of the resin sulfonic acid which were soluble in water.

In place of the alkenylaromatic resin used in the foregoing example, there can be used other of the benzene-soluble solid alkenylaromatic resins of the kind hereinbefore defined with substantially the same results. In place of perchloroethylene, other liquid chlorinated aliphatic hydrocarbons and mixtures thereof can be used as suspension media for the sulfuric acid-partially sulfonated resin compositions with substantially the same results. In place of the silane-treated silica used as the emulsifier-stabilizer in the foregoing example there can

What is claimed is:

1. A method for the sulfonation of alkenylaromatic polymers with sulfuric acid by the procedural sequence of (1) mixing sulfuric acid of from 90 to 100 percent strength with finely divided dry solid particles of a benzene-soluble addition polymer of an alkenylaromatic compound having the general formula

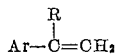

wherein the radical Ar— is a monovalent aromatic radical having its valence bond on a carbon atom of a sulfonatable aromatic nucleus and the radical R— is selected from the group consisting of hydrogen and methyl radicals, the sulfuric acid and the polymer being mixed together as the only reactants in amounts of from 1 to 10 mole-weights of sulfuric acid per mole-weight of alkenylaromatic compound in the polymer and maintaining the resulting mixture at sulfonation reaction temperatures between 0° C. and 200° C. until the surfaces of the polymer particles are appreciably sulfonated to an extent such that the partially sulfonated polymer particles are not soluble in the liquid chlorinated aliphatic hydrocarbon referred to hereinafter in step 2 but not to an extent such that the sulfonated resin becomes soluble in the sulfuric acid phase, which resulting mixture of sulfuric acid and partially sulfonated polymer particles is still fluid, and thereupon (2) dispersing the fluid mixture of sulfuric acid and partially sulfonated polymer as discrete droplets of a discontinuous phase into a liquid chlorinated aliphatic hydrocarbon suspending medium having in its molecular structure from one to two carbon atoms and at least two chlorine atoms to form a suspension in which the amount of the dispersed sulfuric acid-polymer sulfonate mixture is from 1 to 50 percent by weight of the resulting suspension and maintaining the resulting suspension at sulfonation reaction temperatures between 0° C. and 200° C. and continuing the sulfonation reaction until there is obtained a free-flowing slurry of the sulfuric acid-polymer sulfonic acid phase in the form of discrete beads suspended in the liquid chlorinated aliphatic hydrocarbon medium.

2. The method according to claim 1, wherein the liquid chlorinated aliphatic hydrocarbon medium also contains colloidally dispersed therein as the sole emulsion-stabilizer means a colloidal particle suspending agent in amount of from 0.1 to 2.5 percent by weight based on the combined weight of the sulfuric acid and the starting polymer, the colloidal particle suspending agent being one which stabilizes an emulsion consisting of one volume of concentrated sulfuric acid as the sole dispersed liquid phase in at least one volume of the liquid chlorinated aliphatic hydrocarbon as the sole continuous phase with the colloidal particle suspending agent being present in amount from 0.01 to 0.5 percent by weight of such liquid chlorinated aliphatic hydrocarbon phase.

3. The method according to claim 2, wherein the colloidal particle suspending agent is an inorganic hydroxy-oxide on the surfaces of which are hydrocarbon radical-substituted silicon groups in proportion such that there is from 25 to 85 percent hydroxylation of the particle surfaces.

4. The method according to claim 3, wherein the colloidal particle suspending agent is the reaction product of finely divided silica and a hydrocarbon-halosilane.

5. The method according to claim 3 wherein the colloidal particle suspending agent is the reaction product of finely divided silica and octadecyl trichlorosilane.

6. The method according to claim 1, wherein the starting addition polymer is an addition polymer of ar-vinyltoluene.

References Cited in the file of this patent

UNITED STATES PATENTS

| 2,604,461 | Roth | July 22, 1952 |
| 2,809,960 | Roth | Oct. 15, 1957 |